May 20, 1958

D. B. ACKER 2,835,504

LOCKING AND ADJUSTING DEVICE FOR TRAILER BOGIES

Filed Feb. 1, 1956

INVENTOR.
DOUGLAS B. ACKER
BY

Horace B. Van Valkenburgh

ATTORNEY

May 20, 1958   D. B. ACKER   2,835,504
LOCKING AND ADJUSTING DEVICE FOR TRAILER BOGIES
Filed Feb. 1, 1956   3 Sheets-Sheet 2
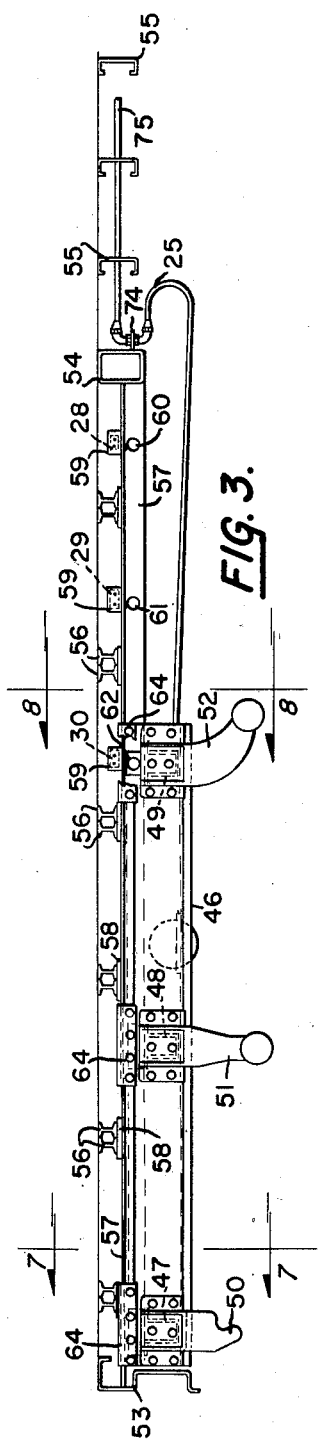
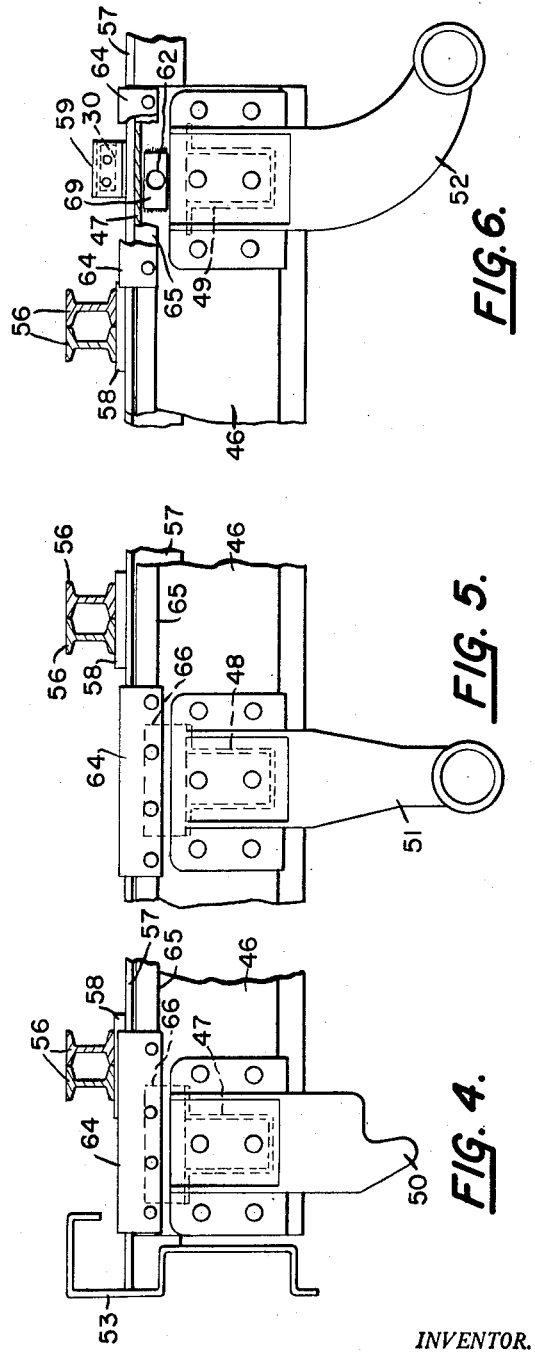
INVENTOR.
DOUGLAS B. ACKER
BY
Horace B. Van Valkenburgh
ATTORNEY May 20, 1958 D. B. ACKER 2,835,504
LOCKING AND ADJUSTING DEVICE FOR TRAILER BOGIES
Filed Feb. 1, 1956 3 Sheets-Sheet 3
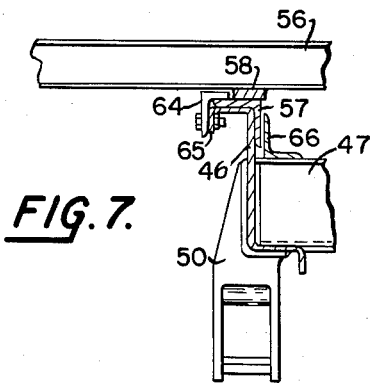
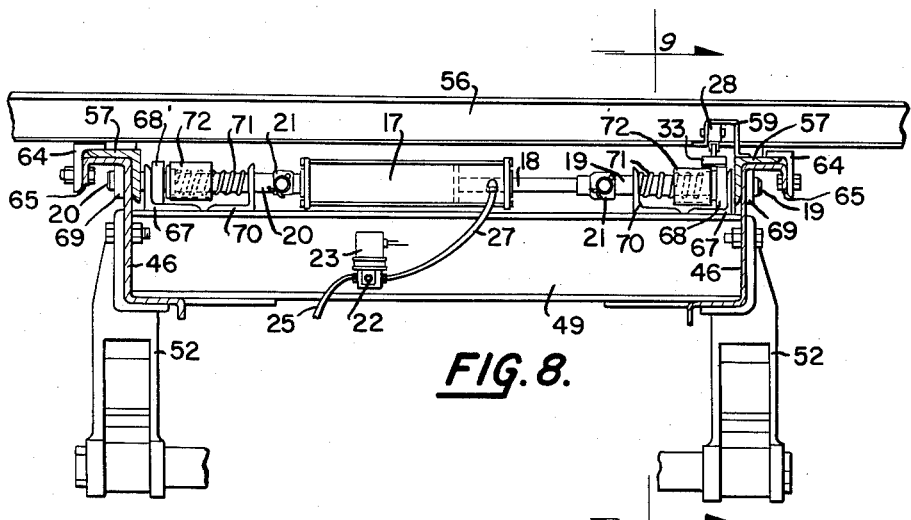
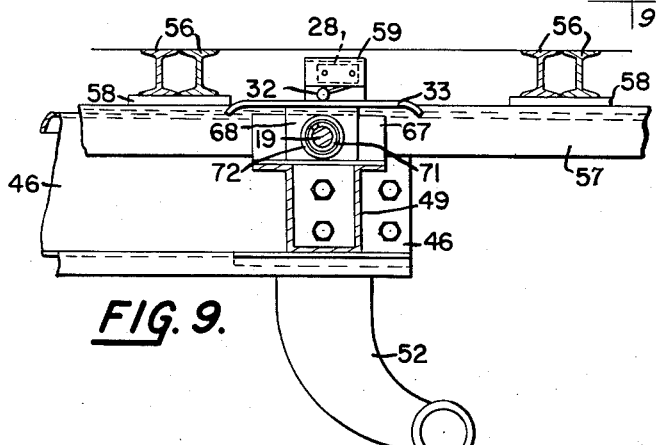
INVENTOR.
DOUGLAS B. ACKER
ATTORNEY United States Patent Office 2,835,504
Patented May 20, 1958

2,835,504

LOCKING AND ADJUSTING DEVICE FOR TRAILER BOGIES

Douglas Bilger Acker, Westminster, Colo., assignor to Timpte Bros., Inc., Denver, Colo., a corporation of Colorado Application February 1, 1956, Serial No. 562,751

7 Claims. (Cl. 280—81)

This invention relates to bogies or wheeled undercarriages for vehicles, such as relatively large trailers, and more particularly to a device for adjusting and locking a bogie in a desired position.

In cargo trailers which are drawn by tractors, the tractor is normally provided with front wheels, an engine and one or more sets of rear wheels driven by the engine. The trailer is pivotally connected to the tractor and may be adjustable so that the front end of the trailer may be moved to one of several different positions, forwardly or rearwardly of the center line of the tractor rear wheels. Many cargo trailers are equipped with bogies or wheeled undercarriages which are adjustable forwardly or rearwardly, since adjustment is often desired in order that the statutory load, which may differ in various states, will not be exceeded at any set of wheels. With a relatively light load, there is no difficulty, but for heavier loads and particularly if the load is such that more weight tends to be concentrated at either the front or the rear of the trailer, adjustments are necessary. Thus, if the load is concentrated at the front of the cargo trailer, it is desirable to adjust the front of the trailer as far back as possible on the tractor, when the same is adjustable, and also move the bogie or rear wheels of the trailer as far forwardly as possible. With the reverse situation, when the load is concentrated toward the rear of the trailer, it is desirable to adjust the front of the trailer as far ahead as possible on the tractor and also adjust the bogie or rear wheels of the trailer to a position as far to the rear as possible. Also, if the tractor has only a single drive axle and the front of the trailer is not adjustable relative to the tractor, the bogie may be adjusted so that a greater proportion of the weight of the trailer load will be supported by the bogie. Other loading conditions may, of course, exist, which require other variations of the position of the front of the trailer relative to the tractor and the position of the bogie or rear wheels relative to the trailer. Previously, bogie adjustments required hand operations involving setting the trailer brakes, releasing a lock or catch holding the bogie in position, driving the tractor forwardly or rearwardly to move the trailer in the same direction relative to the bogie and stopping in the exact position for securing the lock or catch in adjusted position. Such an operation is not only time consuming, but requires the time of an additional person stationed at the bogie.

Among the objects of the present invention are to provide a novel locking and adjusting device for bogies or wheeled undercarriages for cargo trailers and the like; to provide such a device by which the adjustment of the bogie position may be controlled from the cab of the trailer by the operator; to provide such a device which will cause the bogie to be automatically locked in a desired adjusted position and remain securely in any adjusted position and does not tend to become accidentially shifted from such adjusted position; to provide such a device which will cause the bogie to remain locked in one position until the appropriate controls are actuated for adjustment to a different position; to provide such a device which requires no attention at the bogie itself for adjustment and thus eliminates the necessity for an additional person; and to provide such a device which is readily manufactured and the parts thereof are sturdy in construction and effective in operation.

Additional objects and the novel features of this invention will become apparent from the description which follows, taken in connection with the accompanying drawings, in which:

Fig. 3 is a fragmentary side elevation of a portion of the parts underneath the trailer at the position of the bogie;

Figs. 4, 5 and 6 are enlarged details of portions of Fig. 3;

Fig. 7 is an enlarged vertical section taken at the position of line 7—7 of Fig. 3;

Fig. 8 is an enlarged vertical section taken at the position of line 8—8 of Fig. 3; and Fig. 9 is a fragmentary longitudinal section, taken at the position of line 9—9 of Fig. 8.

Figure 1:
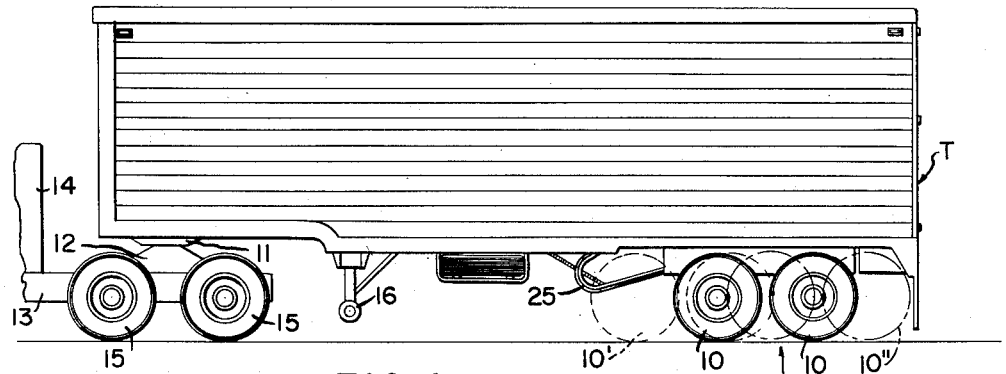
Fig. 1 is a side elevation of a cargo trailer and a tractor, the latter being shown fragmentarily and the former being provided with a bogie locking and adjusting device constructed in accordance with this invention.

As illustrated in Fig. 1, a cargo trailer T may be provided with a bogie B or a wheeled undercarriage at the rear end thereof, such a bogie including two sets of dual wheels 10 at each side thereof, although any other desired or conventional number of wheels may be used. The front end of the trailer T is provided with a slide plate 11 or upper fifth wheel plate which rests upon a bearing plate 12 or fifth wheel mounted on a frame 13 of a tandem tractor having a cab 14 and two sets of dual wheels 15 at the rear, it being understood that the tractor is provided with an engine and front wheels in a conventional manner and may be provided with only one set of drive wheels. The slide plate 11 of the trailer may be adjusted to different positions on the bearing plate 12 and the trailer T is adapted to pivot about a king pin mounted on bearing plate 12 and engaged by suitable cooperating parts on the trailer, in a conventional manner. The trailer may also be provided with a conventional set of small auxiliary wheels 16 for supporting the forward end of the trailer when the tractor is detached therefrom, as well as other conventional parts, including an air supply line leading to the brakes on the bogie wheels 10. In order to adjust the position of the bogie B, as to accommodate different load concentrations and thus insure that the load on any set of wheels does not exceed a safe or maximum statutory limit, the bogie may be adjusted so that the wheels 10 may be moved relative to the trailer to a front or dotted position 10', or to a rear or dot-dash position 10''. Of course, provision may be made for more than three adjusted positions of the bogie.

Figure 2:
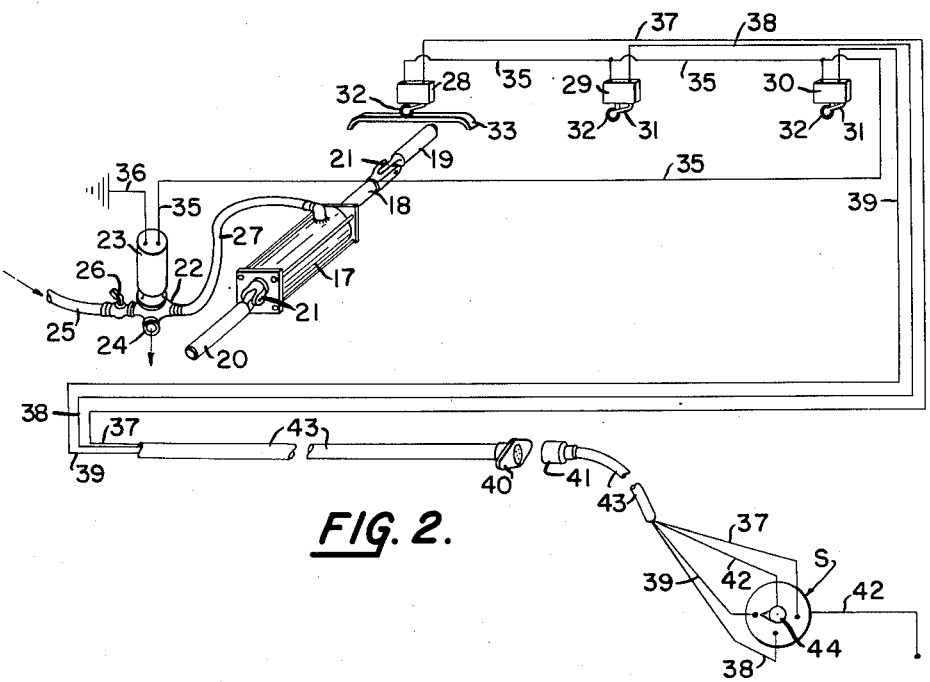
Fig. 2 is a diagrammatic view of the principal control parts of the device of Fig. 1.

In accordance with the present invention, the bogie and trailer are provided with a bogie locking and adjustment device, the principal control parts of which, as shown in Fig. 2, include a floating air cylinder 17 which is mounted on the bogie and encloses a piston connected to a rod 18 extending from one end, with a bogie locking pin 19 mounted on the extending end of rod 18 and a similar pin 20 mounted on the opposite end of the cylinder, each pin being connected through a pivot joint 21 to decrease the possibility of the pins 19 and 20 binding, as well as for readier assembly. The air supply to cylinder 17 is controlled by a three-way valve 22 operated by a solenoid 23, while air valve 22 is provided with an exhaust opening 24 for releasing the air pressure in cylinder 17. Air may be supplied to valve 22 through a hose 25 provided with a shut-off valve 26 and connected to the air brake supply line of the trailer, or any other suitable source. When air pressure is supplied to the interior of the cylinder, as through a hose 27 connected to the cylinder between the position of the piston therein and the adjacent end of the cylinder, the piston rod is moved into the cylinder and the cylinder is moved in the opposite direction, such movement causing the pins 19 and 20 to be retracted. The pins 19 and 20 normally engage holes provided for their reception in certain frame members of the trailer T, as described later, these holes being disposed at positions corresponding to three normally closed microswitches 28, 29 and 30, corresponding to the positions 10', 10 and 10'', respectively, of the bogie wheels shown in Fig. 1. When more than three adjusted positions of the bogie are desired, a corresponding number of microswitches will be utilized and disposed in positions corresponding thereto. Each of the microswitches is opened by a toggle arm 31 provided with a roller 32 adapted to be engaged by a cam 33 mounted on the bogie at the position of the pins 19 and 20. One side of each of the switches 28, 29 and 30 is connected with the solenoid 23 by a wire 35, while the solenoid may be grounded to the trailer frame by a wire 36, the circuit being completed by the usual ground from the trailer to the tractor. However, current can be supplied to solenoid 23 only when one of the microswitches is connected to a source of current through a master switch S, which is conveniently mounted in the cab so as to be usable by the operator, or may be mounted on the front of the trailer or on the tractor in any convenient position.

Thus, each of the microswitches 28, 29 and 30 is individually connected with master switch S by wires 37, 38 and 39, respectively, disconnectable at a jack 40 and plug 41, which are positioned at a convenient point between the tractor and trailer so that the electrical system for the bogie may be disconnected when the tractor is disconnected from the trailer, as well as readily connected again when desired. The wires 37, 38 and 39 are conveniently enclosed within a cable 43, while a lead wire 42 may be connected to the power supply on the tractor, or may be connected to the "hot" line of the trailer electrical harness. The switch S is a four-position switch, having a contact arm 44 connected to lead wire 42, so that the contact arm 44 may be turned to either an off position or to any one of the respective contacts through which current is supplied to one of the wires 37, 38 or 39, and thence to the corresponding microswitch 28, 29 or 30. As will be evident, any of microswitches 28, 29 or 30 is operative to energize the solenoid 23 only when connected to the source of current by the contact arm 44 of switch S being turned to the appropriate position, and also provided that the microswitch roller 32 is out of engagement with cam 33. Thus, when the contact arm 44 of master switch S is moved to the contact to which wire 37, for instance, is connected, in the event that the microswitch 28 is open due to the position of cam 33, the solenoid 23 will not be energized. However, if the contact arm 44 of switch S is moved to either of the other contacts, such as to the contact for wire 39, as shown in Fig. 2, current will be supplied to the corresponding microswitch, such as microswitch 30, the solenoid 23 will cause air to be supplied through hose 21 to cylinder 17. This will cause the pins 19 and 20 to be withdrawn, whereupon the tractor may be moved forwardly, the brakes on the bogie wheels having been set, so that the trailer T will move forwardly over bogie B until cam 33 engages roller 32 for microswitch 30. This will cause solenoid 23 to be de-energized and the air within cylinder 17 to be exhausted through valve outlet 24. As a result, the springs previously described will force pins 19 and 20 outwardly and the movement of the tractor may be continued further until the pins snap into locking position, the amount of such movement being determined by the length of cam 33, which should be such that de-energization of solenoid 23, exhaustion of cylinder 17 and outward pressure by the springs on each of pins 19 and 20 is assured before the desired pin hole is reached. Master switch S should then be moved to the off position, but in the event this is neglected, the bogie will remain securely locked in position, since the microswitch 30 will remain open due to the presence at its position of cam 33. As will be evident, the relative position of the bogie with respect to the trailer T may be adjusted to any other desired position in a similar manner. Of course, if more than three adjusted positions of the bogie are provided and a corresponding number of micro-switches are used, the master switch S will have one position for each microswitch, as well as an off position; while each micro-switch will be individually connected to the corresponding contact of the master switch, in a manner similar to the switches 28, 29 and 30.

As illustrated in Figs. 3 to 8, inclusive, the bogie B may be mounted for sliding movement on the underside of the trailer T in a suitable manner, the bogie conveniently including a longitudinally extending beam 46 at each side, as in Figs. 3 and 8, and a series of transverse beams 47, 48 and 49, with a series of spring hangers 50, 51 and 52 being attached to the longitudinal beams 46 at the position of the respective transverse beams, as in Figs. 3–6. As will be evident, conventional springs and axle and wheel assemblies connected therewith may be mounted on the spring hangers 50, 51 and 52, although other conventional ways of mounting the wheels on the bogie may be utilized, such as rubber pads, air bellows and others. The position of the bogie is adjustable between a rear position, with the rear ends of longitudinal beams 46 adjacent a rear transverse beam 53 of the trailer T, as in Fig. 3; a front position with the front of the bogie longitudinal beams 46 adjacent a transversely extending box beam 54 of the trailer T; and one or more positions intermediate the same. Forwardly of box beam 54, the floor of the trailer may be supported by bolsters 55, while between the rear trailer beam 53 and the box beam 54, the floor of the trailer may be supported by a series of double I beams 56. As shown also in Fig. 7, an angular slide way 57 may extend longitudinally of the trailer at each side of the bogie but inside of the wheels 10, being attached to I beams 56 in a suitable manner, as by pads 58. Also, as in Fig. 8, each of the microswitches 28, 29 and 30 may be mounted inwardly from and slightly above the top of slide 57 at one side by a bracket 59, the air cylinder 17 and pins 19 and 20 being preferably mounted above the front transverse bogie beam 49, while the ways 57 are provided with holes 60, 61 and 62 for the pins 19 and 20 and respectively beneath the microswitches 28, 29 and 30, as in Fig. 3. When additional positions of the bogie are to be provided, corresponding additional holes may be provided in the slide ways 57.

As in Figs. 7 and 8, each longitudinal beam 46 engages the under side of the top flange and also the outside of the downwardly extending flange of the corresponding slide 57, each beam 46, as in Fig. 7, thus conveniently being a Z-beam for the above purpose and also for more secure attachment, as by welding, to the transverse beams and for attachment, as by bolts, to the spring hangers. In addition, to prevent downward movement of the beams 46 of the bogie relative to the trailer, a series of angle clips 64, the top legs of which extend over the top of the top leg of slide 57, may be attached to a downwardly extending flange 65 provided for that purpose at the upper outer edge of the longitudinal bogie beam 46, as in Fig. 7. Conveniently, the angle clips 64 are placed at the same positions as the transverse bogie beams 47, 48 and 49. Also, to provide greater stability of the bogie, an angle 66 may be attached to the tops of transverse bogie beams 47 and 48 and a similar angle 67 to the top of beam 49, the latter angles having holes therethrough for pins 19 and 20, as in Figs. 8 and 9. Each angle 67 may be reinforced at the hole therein for pin 19 or 20 by a block 68 or 68' attached to the inside of the vertical leg of the respective angle 67, while the cam 33 may conveniently be mounted atop block 68. The pins 19 and 20, when in locked position, extend through the holes in the corresponding angle 67 and block 68 or 68', through the hole in way 57 and thence through a hole in beam 46 in alignment with the hole in angle 67, each beam 46 preferably being reinforced at the hole by a boss 69 welded thereto. Pins 19 and 20 also extend through a hole in an angle 70, mounted atop beam 49 inwardly from the corresponding angle 67. When disengaged, the ends of pins 19 and 20 will extend outwardly only into the hole in block 68 or 68'.

To maintain the pins 19 and 20 in outwardly extended position, except when withdrawn by air pressure supplied to cylinder 17, a compression spring 71 surrounds each of the pins 19 and 20 and bears at one end against the angle 70, the opposite end of the spring extending into a cup 72 which is attached, as by welding, to the respective pin 19 or 20 and also acts as a stop to limit inward movement of the respective pin 19 or 20 by abutment against angle 70. As will be evident, when piston rod 18 moves into cylinder 17, both pin 19 and 20 will normally be retracted until the inner end of each cup 72 abuts against the corresponding angle 70. In the event one of the pins 19 or 20 should be harder to move, as by friction in the holes caused by a slight tip of the trailer or the like, the easier pin to move will be moved inwardly, but as soon as rod 18 has been retracted into cylinedr 17 approximately half its full travel, so that the cup 72 on one of the pins 19 or 20, i. e., the pin which has just been moved inwardly, abuts the corresponding angle 70, the full pressure within the cylinder 17 will be exerted against the opposite pin which will cause the opposite pin to be retracted. The hose 25 for supplying air to the valve 22 may, as in Fig. 3, extend from the front of the bogie to a connection 74 with a trailer air supply pipe 75 conveniently at a point just forwardly of box beam 54, while the solenoid 23 and air valve 22 may be mounted on the front transverse beam 49, as in Fig. 8, or in any other suitable position.

As will be evident, when the pins 19 and 20 are retracted by energization of solenoid 23, the trailer may be moved along the bogie, the brakes previously having been set, until cam 33 opens the microswitch 28, 29 or 30 at the position selected for the bogie. When the solenoid 23 is de-energized, the air in the cylinder will be exhausted through the valve 22 and the springs 71 will force the outer ends of pins 19 and 20 out against the respective way 57. However, as the trailer continues to be moved, preferably relatively slowly, as soon as the pins 19 and 20 reach the respective hole 60, 61 or 62, the pins will drop into the same, thus locking the bogie in position. To facilitate the ease with which the pins will drop into the holes, the outer ends of the pins may be beveled off, as in Fig. 8.

From the foregoing, it will be evident that the adjusting and locking device for a bogie or the like, constructed in accordance with this invention, fulfills to a marked degree the requirements and objects hereinbefore set forth. The placement of the master switch in the cab means that the locking device can be controlled by the driver and without the necessity for additional personnel at the bogie. Also, even though the switch is accidentally left in the position for which the last previous adjustment has been made, the bogie will remain locked in position, since the corresponding microswitch will be held open by the cam. Also, once the pins are retracted, the air cylinder will not be exhausted until the desired position is reached, so that the bogie can be moved from the forward position to the rear position without locking at the intermediate position and vice versa. Also, since the cam preferably extends to each side of the locking pin, the cylinder will be exhausted before the desired pin hole is reached, so that the selected position cannot be passed over when moving thereto. Due to the fact that the locking pins extend not only through the main longitudinal frame members of the bogie, but also through the slideway mounted on the trailer and in addition are supported on the opposite side of the way, the bogie is locked securely to the trailer with the pins in extended position. Nevertheless, the device is simple to use, even by an operator who has had no previous experience therewith.

It will be understood that various changes may be made in the bogie and in the adjusting mechanism therefor. The position of the locking devices, such as pins 19 and 20, as well as the position of cam 33 and the microswitches, may be varied from that shown, as well as the cam being mounted on the trailer and the switches on the bogie. Also, other types of retractable locking devices, such as cams and cooperating cam slots, may be substituted for the pins and holes therefor. Other types of stops for the locking devices, rather than the cups 72, such as projections on the pins or other locking devices and stops on the bogie frame, may be utilized. Furthermore, the locking device may be used with other types of wheeled undercarriages and with other types of tractors and trailers, or with other types of vehicles.

Although a specific embodiment of this invention has been illustrated and described and certain changes therein indicated, it will be understood that other embodiments may exist and numerous variations made therein, all without departing from the spirit and scope of this invention.

What is claimed is:

1. In an adjusting and locking device for a vehicle having a wheeled undercarriage and means connecting said undercarriage and vehicle for sliding movement therebetween, the improvement comprising means for locking said undercarriage to said vehicle in a plurality of positions; electrically controlled, air actuated means for releasing said locking means to permit relative movement between said vehicle and undercarriage to a different selected position; and means for automatically rendering said releasing means inoperative when said selected position is reached, including a plurality of switches mounted on one of said vehicle and undercarriage.

2. In an adjusting and locking device for a trailer attached to a tractor, said trailer having a wheeled undercarriage and means connecting said undercarriage and trailer for sliding movement therebetween, the improvement comprising means for locking said undercarriage to said trailer in a plurality of positions; means for releasing said locking means for relative movement between said vehicle and undercarriage to a different selected position; and control means for said releasing means including a plurality of electrical switches mounted in spaced positions on one of said trailer and undercarriage and a master switch for said first named switches mounted on said tractor.

3. In an adjusting and locking device for a vehicle having a wheeled undercarriage and means connecting said undercarriage and vehicle for sliding movement therebetween, the improvement comprising oppositely disposed retractable members for locking said undercarriage to said vehicle in a plurality of positions; an air cylinder having a piston and a piston rod, one said member being connected to said cylinder and the other said member to said piston rod; a plurality of normally open switches mounted on one of said vehicle and undercarriage in spaced positions; a cam for closing said switches mounted on the other of said vehicle and undercarriage in a position to close each switch in turn as said switch is reached; a valve for supplying air under pressure to said cylinder between said piston and the rod end of said cylinder and for exhausting air from said cylinder; electrical means for actuating said valve; a master switch having contacts and wires connecting a different contact with one side of each of the respective switches for supplying current to a selected switch; and an electrical connection between the opposite side of each of the respective switches and said electrical means for actuating said valve.

4. In an adjusting and locking device for a vehicle having a wheeled undercarriage and means connecting said undercarriage and vehicle for sliding movement therebetween and including a slide way on said vehicle at each side of said undercarriage, the improvement comprising oppositely disposed, retractable pins for locking said undercarriage to said vehicle in a plurality of positions, said slide ways having spaced holes therein engageable by said pins; an air cylinder having a piston and a piston rod, one said pin being connected to said cylinder and the other said pin to said piston rod; and means for controlling the supply of air to said cylinder in accordance with the position of said undercarriage relative to said vehicle and the adjustment thereof to a different relative position, including a plurality of switches mounted on said vehicle in spaced positions along one slide way corresponding to said holes and a cam for actuating said switches and mounted on said undercarriage.

5. In an adjusting and locking device for a vehicle having a wheeled undercarriage and means connecting said undercarriage and vehicle for sliding movement therebetween and including a slide way on said vehicle at each side of said undercarriage, the improvement comprising oppositely disposed, retractable pins for locking said undercarriage to said vehicle in a plurality of positions, said slide ways having spaced holes therein engageable by said pins; an air cylinder having a piston and a piston rod, one said pin being connected to said cylinder and the other said pin to said piston rod, said pins being retracted by the respective cylinder and piston rod; resilient means for moving said pins into engagement with said holes; means for controlling the supply of air to said cylinder in accordance with the position of said undercarriage relative to said vehicle and the adjustment thereof to a different relative position, including a plurality of switches mounted on said vehicle in spaced positions along one slide way corresponding to said holes, a cam for actuating said switches and mounted on said undercarriage, said cam having a length such that each switch is actuated before said pins reach the corresponding hole during relative movement between said undercarriage and vehicle; and a master switch spaced from said undercarriage and individually connected with each of said first-named switches.

6. In an adjusting and locking device for a vehicle having a wheeled undercarriage and means connecting said undercarriage and vehicle for sliding movement therebtween, the improvement comprising means for locking said undercarriage to said vehicle in a plurality of positions; means for releasting said locking means to permit relative movement between said vehicle and undercarriage to a different selected position, said releasing means including electrically controlled, air actuated means; means for rendering said releasing means inoperative when said selected position is reached, including a plurality of switches mounted on one of said vehicle and undercarriage; and a selective master switch located in a position spaced from said undercarriage, said plurality of switches being individually connected to said selective master switch.

7. In an adjusting and locking device for a vehicle having a wheeled undercarriage and means connecting said undercarriage and vehicle for sliding movement therebetween, the improvement comprising oppositely disposed retractable members for locking said undercarriage to said vehicle in a plurality of positions; an air cylinder having a piston and a piston rod, one said member being connected to said cylinder and the other said member to said piston rod; means including a valve for supplying air under pressure to said cylinder between said piston and the rod end of said cylinder and for exhausting air from said cylinder; a plurality of normally open switches mounted on one of said vehicle and undercarriage in spaced position; a cam for closing said switches, mounted on the other of said vehicle and undercarriage in a position to close each switch in turn as said switch is reached; and electrical means for actuating said valve and including said switches.

References Cited in the file of this patent

UNITED STATES PATENTS

| 2,576,816 | Wahlberg | Nov. 27, 1951 |
| 2,589,678 | Delay | Mar. 18, 1952 |
| 2,684,108 | Rappl | July 20, 1954 |
| 2,758,872 | Solomon et al. | Aug. 14, 1956 |

FOREIGN PATENTS

| 584,416 | Great Britain | Jan. 14, 1947 |